United States Patent
Kim et al.

(10) Patent No.: US 11,573,958 B2
(45) Date of Patent: Feb. 7, 2023

(54) IN-DOCUMENT SEARCH METHOD AND DEVICE FOR QUERY

(71) Applicant: 42Maru Inc., Seoul (KR)

(72) Inventors: Dong Hwan Kim, Seoul (KR); Jin Min Park, Seoul (KR); Ju Kwan Lee, Seoul (KR); Hyuk Sung Kwon, Gyeonggi-do (KR); Hyeong Jin Jang, Gyeonggi-do (KR)

(73) Assignee: 42 Maru Inc., Seoul (KR)

( * ) Notice: Subject to any disclaimer, the term of this patent is extended or adjusted under 35 U.S.C. 154(b) by 0 days.

(21) Appl. No.: 17/133,783

(22) Filed: Dec. 24, 2020

(65) Prior Publication Data

US 2022/0188300 A1    Jun. 16, 2022

(30) Foreign Application Priority Data

Dec. 15, 2020 (KR) .................. 10-2020-0175181

(51) Int. Cl.
| | |
|---|---|
| G06F 16/248 | (2019.01) |
| G06F 16/242 | (2019.01) |
| G06F 16/22 | (2019.01) |
| G06K 9/62 | (2022.01) |

(52) U.S. Cl.
CPC .......... *G06F 16/243* (2019.01); *G06F 16/221* (2019.01); *G06F 16/2237* (2019.01); *G06F 16/2282* (2019.01); *G06F 16/248* (2019.01); *G06K 9/6215* (2013.01)

(58) Field of Classification Search
None
See application file for complete search history.

(56) References Cited

U.S. PATENT DOCUMENTS

| | | | |
|---|---|---|---|
| 9,177,225 B1* | 11/2015 | Cordova-Diba | ... G06K 9/00671 |
| 9,613,004 B2* | 4/2017 | Liang | ...................... G06F 40/10 |
| 10,769,496 B2* | 9/2020 | Attorre | ................ G06K 9/6257 |
| 2009/0070081 A1* | 3/2009 | Saenz | ................. G07F 17/3227 |
| | | | 703/2 |
| 2009/0198678 A1* | 8/2009 | Conrad | ................. G06F 16/215 |

(Continued)

FOREIGN PATENT DOCUMENTS

| | | |
|---|---|---|
| KR | 20130097018 | 9/2013 |
| KR | 20200033009 | 3/2020 |

OTHER PUBLICATIONS

Extended European Search Report and Written Opinion dated Jun. 9, 2021 for EP 20216936, 10 pages.

(Continued)

*Primary Examiner* — Wilson Lee
(74) *Attorney, Agent, or Firm* — Adsero IP (57) ABSTRACT

The present invention relates to an in-document search method and device for a query vector, and an object of the present invention is to improve the accuracy of a response by generating sentence data corresponding to data in a table form stored in database. The in-document search method for a query vector includes a step A of receiving a user query from a user terminal, a step B of generating a user query vector for the user query, a step C of extracting candidate table data based on the user query vector in a data storage module, a step D of searching for a response corresponding to the user query vector in the candidate table data, and a step E of providing the response to the user terminal.

10 Claims, 4 Drawing Sheets

(56) References Cited

U.S. PATENT DOCUMENTS

| | | | |
|---|---|---|---|
| 2012/0197864 A1 | 8/2012 | Bourdoncle | |
| 2016/0364434 A1* | 12/2016 | Spitz | G06F 16/215 |
| 2017/0277668 A1* | 9/2017 | Luo | G06F 16/345 |
| 2019/0102395 A1* | 4/2019 | Kshetramade | G06F 16/9535 |
| 2019/0220670 A1* | 7/2019 | Shimizu | G06K 9/44 |
| 2020/0134377 A1* | 4/2020 | Attorre | G06K 9/6274 |
| 2020/0242171 A1* | 7/2020 | Pogrebezky | G06F 16/906 |
| 2020/0388398 A1* | 12/2020 | Conroy | G06K 9/6215 |
| 2021/0004416 A1* | 1/2021 | Xiong | G06F 40/289 |

OTHER PUBLICATIONS

Office Action dated Aug. 18, 2022 for Korean Application 2020-0175181, w/ Machine Translation, 19 pages.

* cited by examiner

IN-DOCUMENT SEARCH METHOD AND DEVICE FOR QUERY

CROSS-REFERENCE TO RELATED APPLICATIONS

This application claims priority to and the benefit of Korean Patent Application No. 10-2020-0175181, filed Dec. 15, 2020, the disclosure of which is incorporated herein by reference in its entirety.

BACKGROUND OF THE INVENTION

Field of the Invention

The present invention relates to an in-document search method and device for a query, and more particularly, to a method and a device for searching a table in which certain contents are arranged in a certain format and order.

Description of the Related Art

Machine reading comprehension (MRC) and question answering (QA) are one of the fundamental tasks for natural language understanding. Due to the increased complexity of deep neural networks and the transfer of knowledge from the language models pretrained on large-scale corpora, state-of-the-art QA models have achieved human-level performance. However, since a commonly used QA system is based on architecture for performing search based on a text form, there is a problem that the quality of the search is not stable in the case of data in a table form.

SUMMARY OF THE INVENTION

An object of the present invention is to solve the above-described problem, and to provide a method of searching for data in a table form. Further, an object of the present invention is to improve the accuracy of search by generating sentence data corresponding to data in a table form.

In addition, an object of the present invention is to improve immediacy by providing a response in a table form with respect to a query.

In order to achieve the objects, an in-document search method for a query vector, which is performed by a server, includes a step A of receiving a user query from a user terminal, a step B of generating a user query vector for the user query, a step C of extracting candidate table data based on the user query vector in a data storage module, a step D of searching for a response corresponding to the user query vector in the candidate table data, and a step E of providing the response to the user terminal.

Further, an in-document search device includes a query receiving module configured to receive a user query, generate a user query vector for the user query, and analyze the user query vector, and a response generating module configured to extract candidate table data based on the user query vector in a data storage module storing table data in an SQL table form and a sentence form, search for a response corresponding to the user query vector in the candidate table data, and provide the response to a user.

DETAILED DESCRIPTION OF THE PREFERRED EMBODIMENTS

The above-described objects, features, and advantages will be described below in detail with reference to the accompanying drawings, and accordingly, a person skilled in the art to which the present invention pertains can easily implement the technical spirit of the present invention. In describing the present invention, when it is determined that the detailed description of the known technology related to the present invention may unnecessarily obscure the gist of the present invention, the detailed description thereof will be omitted.

In the drawings, the same reference numerals are used to indicate the same or similar elements, and all combinations described in the specification and claims may be combined in any manner. Further, unless otherwise specified, it should be understood that references to the singular form may include more than one, and references to the singular form may also include the plural form.

The terms used in this specification are for the purpose of describing specific exemplary embodiments only and are not intended to be limiting. Singular expressions as used herein may also be intended to include plural meanings unless clearly indicated otherwise in the corresponding sentence. The term "and/or" includes all combinations and any one of items listed in connection therewith. The terms "comprise", "comprising", "including", "having" and the like have inclusive meanings, and accordingly, these terms specify features, integers, steps, operations, elements, and/or components, and does not exclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

In addition, each component may be implemented as a hardware processor, the above components may be integrated to be implemented as a single hardware processor, or the above components may be combined with each other to be implemented as a plurality of hardware processors.

Hereinafter, preferable embodiments of the present invention will be described in detail with reference to the accompanying drawings.

Figure 1:
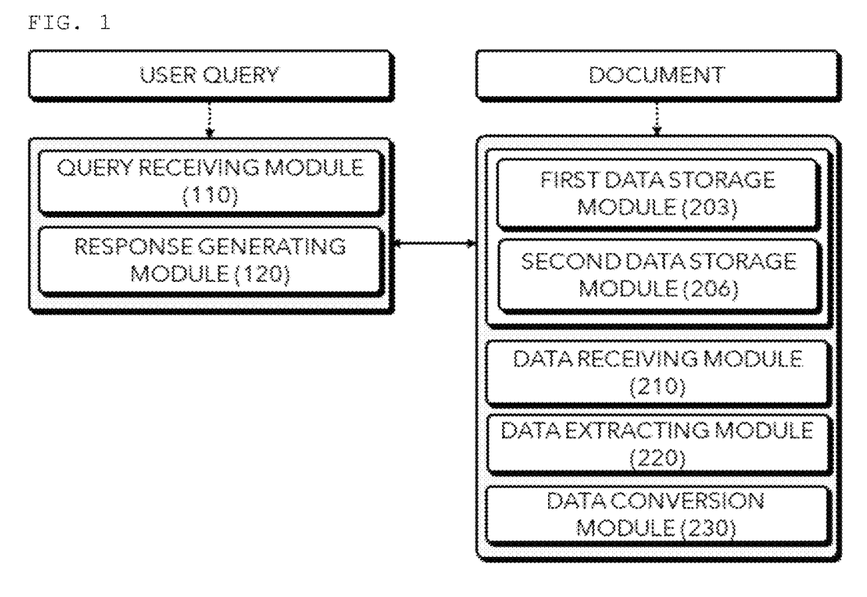
FIG. 1 is a diagram showing a configuration of an in-document search device for a query vector according to an embodiment of the present invention.

FIG. 1 is a block diagram showing a structure of an in-document search device for a query vector according to an embodiment of the present invention.

Referring to FIG. 1, an in-document search device for a query vector according to an embodiment of the present invention may include a query receiving module 110, a response generating module 120, a data receiving module 210, a data extracting module 220, a data conversion module 230, and a data storage module 200. In some cases, the data storage module 200 may include a first storage module 203 for storing data in a table form and a second storage module 206 for storing data in a sentence form. According to an embodiment of the present invention, the data conversion module 230 may generate data in a sentence form stored in the second storage module 206 by processing the data in a table form stored in the first storage module 203, a detailed description of which will be described later.

The query receiving module 110 may receive a query (question) from a user terminal. The query receiving module 110 may include at least one encoder to generate a user query vector representing the structure and meaning of the natural language query by encoding the received natural language query. The encoder included in the query receiving module 110 may be composed of a neural network, and may be a neural network model trained to generate a query vector (embedding vector). The query receiving module 110 may encode the query in units of morpheme, so that the morpheme analysis can be further performed when analyzing the user query vector.

The query receiving module 110 may figure out the intention of the user query by analyzing the user query vector. The query receiving module 110 will use conventional techniques such as morpheme analysis, syntax analysis, and vocabulary meaning analysis in analyzing user query vectors.

The response generating module 120 may search for a response in the data storage module 200 based on the analyzed user query vector.

According to an embodiment of the present invention, the response generating module 120 may search for a response corresponding to the user query vector based on data in a sentence form included in the second data storage module. In this case, the response generating module 120 may apply a preset similarity calculation algorithm to calculate a similarity between the query vector and the data included in the second data storage module.

Thereafter, when the response generating module 120 searches for a response corresponding to the user query vector in the second data storage module, the response generating module 120 may search for first data corresponding to the response in the first data storage module. Meanwhile, according to another embodiment of the present invention, the response generating module 120 may extract candidate table data including the response based on a similarity between a table caption of at least one table data included in the second data storage module and the user query vector.

When the candidate table data is extracted, the response generating module 120 may search for the user query vector from data in a sentence form, which is obtained by processing the candidate table data, to search for a response corresponding to the user query vector. When searching for the response, the response generating module 120 may extract a plurality of candidate responses. The response generating module 120 may calculate a similarity between the candidate response and the user query vector. The response generating module 120 will apply a preset similarity calculation algorithm to calculate the similarity.

The response generating module 120 may sort the candidate responses based on similarities, and set the candidate response having the highest similarity as a response corresponding to the user query vector.

When the response corresponding to the user query vector is found from the second data storage module, the response generating module 120 may search for first data corresponding to the response from the first data storage module. Data stored in the first data storage module and data stored in the second data storage module are associated with each other.

The response generating module 120 may provide a response to the user query to a user if the user query vector and the response thereto are stored in the data storage module 200.

The response generating module 120 according to an embodiment of the present invention may provide the response in a sentence form based on the second data or in a table form based on the first data when providing the response to the user. More specifically, the response generating module 120 may provide a response in a sentence form to the user, may provide entire table data containing the response, or may provide a region containing the response of the table data.

When the entire table data is provided to the user, the response generating module 120 may highlight and provide the region containing the response, enabling the user to immediately check the response.

According to another embodiment of the present invention, when the input user query vector is not stored in the data storage module 200, the response generating module 120 may provide the user with a response to a similar query corresponding to the user query vector. In this case, a similar query search module (not shown) that searches for a similar query based on the user query vector may be included. The similar query search module may search for a query having a vector identical or similar to the user query vector among queries stored in the data storage module 200. The data storage module 200 may store a pair of (query and response) in which the query is associated with the response to the query. For example, in the data storage module 200, a pair (query, response, query vector) may be stored in a table form or a sentence form.

The similar query search module may determine a vector located within a predetermined distance from the user query vector in the Euclidean space as a similar vector in order to search for a query having a vector similar to the user query vector in the data storage module 200. Also, the similar query search module may determine a similarity based on a cosine similarity. The similar query search module may generate a similar query candidate group having a similarity equal to or greater than a first threshold value, by using the similar query search result.

The similar query candidate group may consist of only queries, or may include at least one of a query, a response, and a query vector. Also, the similar query candidate group may further include a similarity value representing a similarity with the user query vector for each query belonging to the candidate group. Furthermore, the similar query candidate group may further include an order of similarities between queries belonging to the candidate group.

The similar query search module may select a similar query using information on the similar query candidate group. The similar query search module may select a query whose a similarity value is greater than or equal to a preset second threshold value among the queries belonging to the similar query candidate group.

When a similar query is found by the similar query search module, the response generating module 120 may provide a response to the selected similar query to the user. In this case, a method of searching for and providing a response to a similar query may be substantially the same as a method of searching for and providing a response to a user query.

When the response generating module 120 provides the user with the response corresponding to the similar query, the response generating module 120 may provide the user with the response to the similar query together with the similar query. The reason for this is to prevent misunderstanding of users when the similar query has different meanings from the user query.

For example, when the user inputs a query of "How much is it to the city hall?", the similar query search module 120 may select a similar query such as the similar query "How long does it take to reach the city hall?" "How far is the city hall to go?", or "How much is the transportation cost to reach the city hall?". Also, in the case of the similar query "How long does it take to reach the city hall?", there are similar queries "How much is the transportation cost to reach the city hall by car?", "How much is the transportation cost to reach the city hall by public transportation?" or "How much is the transportation cost to get to City Hall on foot?".

In this case, since the user may misunderstand the response for a different meaning as the answer to the query input by the user when only an answer to the similar query is provided to the user, the response generating module 120 may provide the similar query together when providing the response to the similar query.

The in-document search device for a query vector according to an embodiment of the present invention may reconfigure an existing data set to configure the data storage module 200. More specifically, the data receiving module 210 may receive a search target document from a user or collect a document using a crawler. The document may include, for example, a PDF document, a web document written in HTML or the like, but is not limited thereto.

The data extracting module 220 may extract table data from the received document. The data extracting module 220 may extract table data having a table form included in the document. The data extracting module 220 may identify a location of the table data, generate structure information, and extract a caption and a column (field) of the table data, and a record corresponding to the column.

The data extracting module 230 may generate an embedding vector corresponding to the table data. The embedding data is a vector representing the structure and meaning of the table data expressed in natural language.

The data conversion module 230 may process the embedding vector of the table data in order to store the table data extracted by the data extracting module 220 in the data storage module 200. The data conversion module 230 may process the table data suitably for each format of the table-based first data storage module 203 and the sentence-based second data storage module 206.

The data conversion module 230 may store the table data in the first data storage module 203. The first data storage module 203 may be composed of a combination of columns (fields) and records corresponding to the respective columns in the same format as a commonly used database.

Specifically, the data conversion module 230 may generate first data by using data corresponding to a column (field) of the table data as a column (field) of first data and data corresponding to a record of the table data as a record of the first data. In order to store the first data in the second data storage module 206, the data conversion module 230 may generate second data in a sentence form based on the first data. The data conversion module 230 may generate the second data in a sentence form by using the column of the first data as a subject (query) and a record (response) corresponding to each column as a predicate. The data conversion module 230 may generate a sentence regardless of a type of data (text, data in a table form, or the like).

For example, in a case where the caption of the table data is MARU Electronics 2020 financial statement, when the first data is (column) total assets and (record) 13,259,038,700, the data conversion module 230 may generate second data such as (MARU Electronics 2020 financial statement, total Assets, 13,259,038,700).

Figure 2:
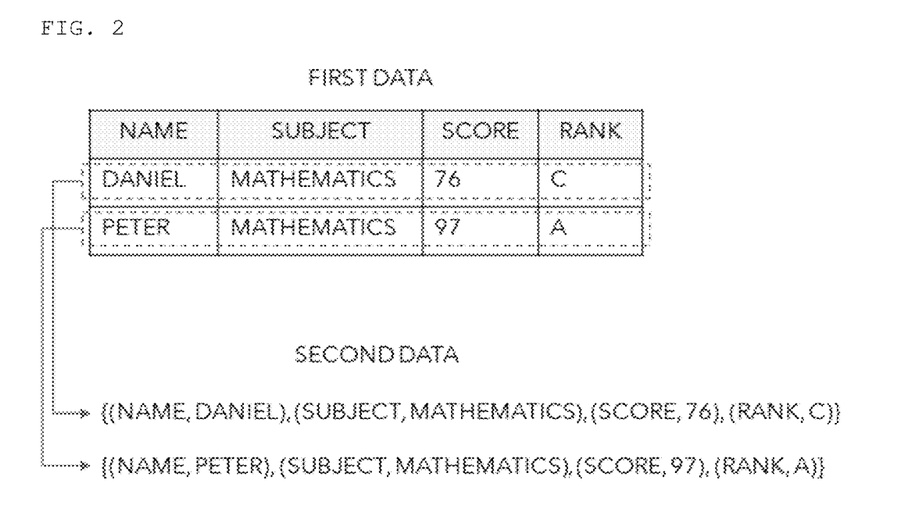
FIG. 2 is a view showing second data generated based on first data according to an embodiment of the present invention.

The second data generated by the data conversion module 230 based on the first data may be identified through FIG. 2. The second data generated through the first data shown in FIG. 2 may be {(NAME, DANIEL), (SUBJECT, MATHEMATICS), (SCORE, 76), (RANK, C)}, {(NAME, PETER), (SUBJECT, MATHEMATICS), (SCORE, 97), (RANK, A)}.

The data conversion module 230 may store the generated first data in the first data storage module 203 and the second data in the second data storage module 206.

Figure 3:
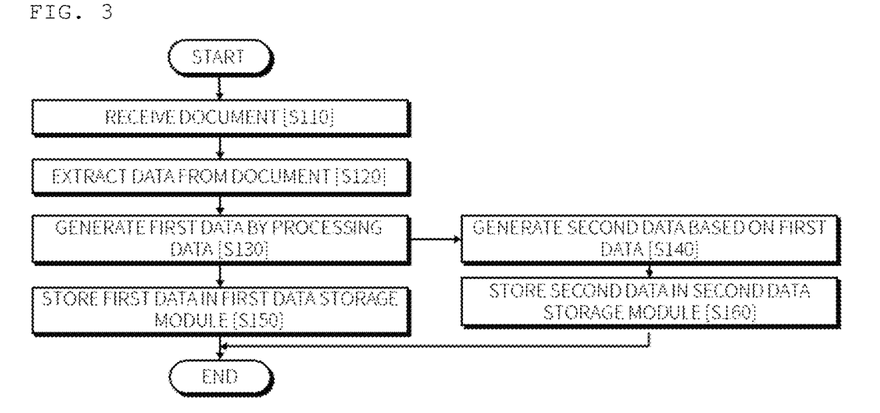
FIG. 3 is a flowchart of a method of constructing a data storage module in the in-document search method for a query vector according to an embodiment of the present invention.
Figure 4:
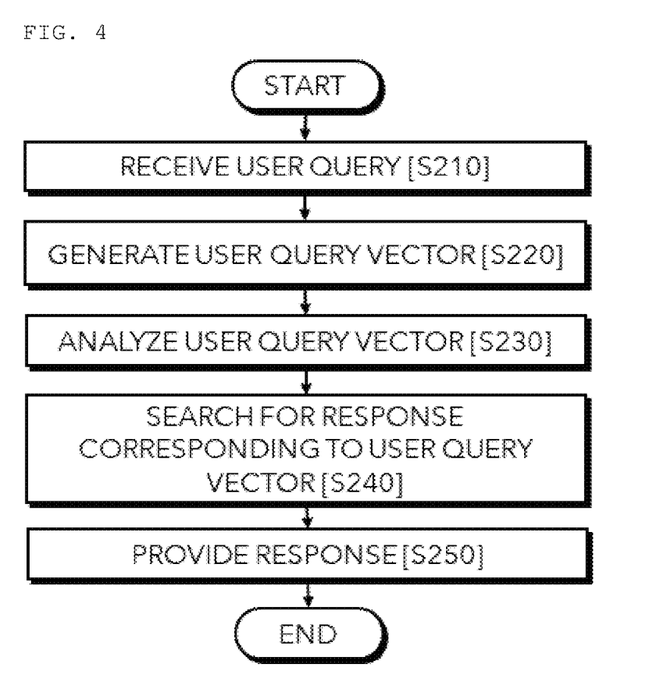
FIG. 4 is a flowchart showing an in-document search method for a query vector according to an embodiment of the present invention.

FIG. 3 is a flowchart for describing a method of constructing a data storage module according to an embodiment of the present invention, and FIG. 4 is a flowchart for describing an in-document search method for a query vector according to an embodiment of the present invention. Hereinafter, the in-document search method for a query vector according to an embodiment of the present invention will be described with reference to FIGS. 3 and 4.

In the related description, detailed embodiments overlapping with the above-described in-document search device for the query vector may be omitted. The in-document search method for a query vector according to an embodiment of the present invention may be implemented with a server. Hereinafter, for convenience of description, a subject performing the in-document search method for a query vector is referred to as a server.

First, referring to FIG. 3, in step 110, the server may receive at least one search target document from a user terminal. According to an additional embodiment of the present invention, a search target document may be directly collected by using a crawler in the server, or may be collected in a manner of acquiring an access right to a certain database. The document may include, for example, a PDF document, a web document written in HTML or the like, but is not limited thereto.

In step 120, the server may extract data from the received document. The server may extract table data in a table form included in the document. The server may identify a location of the table data, generate structure information, and extract a caption and a column (field) of the table data and a record corresponding to the column. Meanwhile, the server may generate an embedding vector corresponding to the table data and representing the structure and meaning of the table data.

The server may process the extracted data. The server may process the data suitably for each format of the table-based first data storage module and the sentence-based second data storage module.

Specifically, the server may store table data as it is in the first data storage module. Furthermore, according to another embodiment of the present invention, the server may set a table format in advance and generate first data by processing the table data according to the corresponding format (step 130). In this case, the first data storage module may be composed of a combination of columns (fields) and records corresponding to the respective columns in the same format as a commonly used database, so that the first data may have an SQL table format.

Furthermore, the server may generate second data in a sentence form to be stored in the second data storage module based on the first data (step 140). The sever may generate the second data in a sentence form by using the column of the first data as a subject (query) and a record (response) corresponding to each column as a predicate.

The server may store the generated first data in the first data storage module (step 150), and store the second data in the second data storage module (step 160). The first data stored in the first data storage module and the second data stored in the second data storage module will be associated with each other.

Hereinafter, an operation of the in-document search method for a query vector, which operates based on the data storage module constructed through the above process, will be described. In step 210, the server may receive a user query based on a user input. The server may receive a user query through a text input by a user input through a keyboard or a touch pad or receive a user query through a speech input by a user's utterance. The user query will be a natural language query expressed in natural language.

In step 220, the server may vectorize the user query. Specifically, the server may generate a user query vector by applying an encoder to the user query.

In step 230, the server may identify the intention of the user query by analyzing the user query vector. The server may use conventional techniques such as morpheme analysis, syntax analysis, and vocabulary meaning analysis in analyzing user query vectors.

In step 240, the server may search for a response in the data storage module based on the analyzed user query vector.

Figure 5:
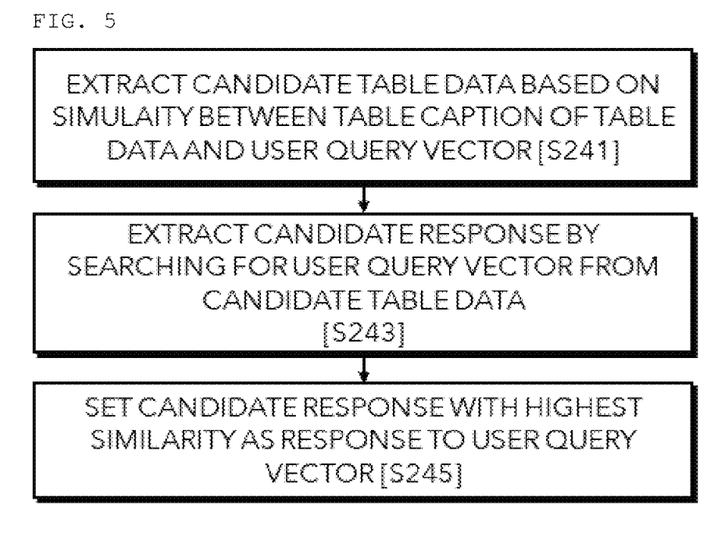
FIG. 5 is a flowchart showing an in-document search method for a query vector according to another embodiment of the present invention.

Referring to step 240 in detail with reference to FIG. 5, the server may extract candidate table data containing a response based on a similarity between a table caption of at least one table data included in the second data storage module and the user query vector (S241).

When the server extracts the candidate table data, the server may search for a user query vector in the candidate table data to search for a response. In searching for a response, the server may extract a plurality of candidate responses (S243).

The server may calculate similarities between the candidate responses and the user query vector, sort the candidate responses based on the similarities, and set a candidate response having the highest similarity as a response to the user query vector (S245). When the response corresponding to the user query vector is found from the second data storage module, the server may search for first data corresponding to the response from the first data storage module.

Returning to the description for FIG. 4, when the user query vector and the response thereto are stored in the data storage module, the server may provide the response to the user query to the user (S250).

The server according to an embodiment of the present invention may provide the response in a sentence form based on the second data or a table form based on the first data when providing the response to the user. More specifically, the server may provide a sentence containing the response to the user, may provide entire table data containing the response, or may provide a column containing the response of the table data.

When the entire table data is provided to the user, the server may highlight the column containing the response, enabling the user to immediately check the response.

Figure 6:
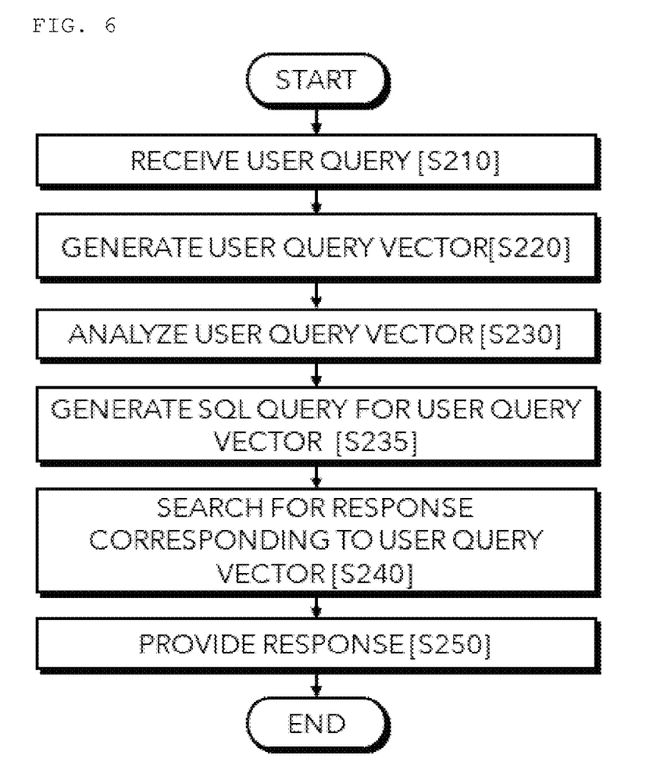
FIG. 6 is a flowchart for describing a method of searching for a response corresponding to a user query in a data storage module according to an embodiment of the present invention.

Meanwhile, according to another embodiment of the present invention, the server may access the data storage module 200 by generating an SQL query based on the user query vector. The query received from the user is a natural language query. As the data storage module 200 requires conversion to an SQL query to search for a response corresponding to the query, the server may further perform a step of creating an SQL query based on the user query vector between step 230 and step 240 of FIG. 4 as shown in FIG. 6.

As the pieces of structural information of databases are all different, the server may generate an SQL query according to a schema indicating structural information of the data storage module 200. The server may generate an SQL query using the schema of the data storage module 200 and the user query vector (S235). Thereafter, the server may use the SQL query to search the data storage module 200 for a response to the user query vector.

Figure 7:
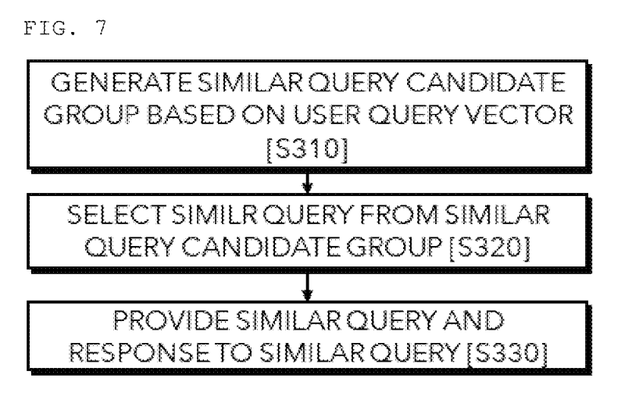
FIG. 7 is a flowchart for describing a method of providing a response through a similar query according to an embodiment of the present invention.

Meanwhile, according to another embodiment of the present invention, when the user query vector is not stored in the data storage module, the server may search for a similar query for the user query vector and provide a response to the similar query to the user. FIG. 7 is a diagram for describing a method of providing a response according to a similar query for a user query vector according to another embodiment of the present invention.

Specifically, referring to FIG. 7, the server may generate a similar query candidate group based on the user query vector (S310). The server may search for queries having a vector that is identical or similar to the user query vector among queries stored in the data storage module, and set the queries as a similar query candidate group.

Specifically, the server may determine a vector located within a predetermined distance from the user query vector in the Euclidean space as a similar vector in order to search for a query having a vector similar to the user query vector in the data storage module. In addition, the server may determine a similarity based on a cosine similarity. The server may generate a similar query candidate group using the similar query search result.

The data storage module may store a pair of (query and response) in which the query is associated with the response to the query. For example, in the data storage module, pairs of (query, response, query vector) may be stored in a table form (first data storage module 203) or in a sentence form (second data storage module 206).

The similar query candidate group may consist of only queries, or may include at least one of a query, a response, and a query vector. Also, the similar query candidate group may further include a similarity value representing a similarity with the user query vector for each query belonging to the candidate group. Furthermore, the similar query candidate group may further include an order of similarities between queries belonging to the candidate group, in the similar candidate group.

The server may select a similar query using the similar query candidate group information (S320). The server may select a query whose a similarity value is greater than or equal to a preset threshold value among the queries belonging to the similar query candidate group.

The server may provide the selected similar query and a response corresponding thereto to the user (S330). The server may provide a user with both the similar query for the user query vector and the response to the similar query. By providing the user with the response corresponding to the similar query together with the similar query, it is possible to prevent the user from misunderstanding the response to the similar query with a different meaning from the user query as a response to the user query.

According to the present invention as described above, it is possible to improve the accuracy of response search by generating sentence data corresponding to data in a table form, which is stored in database, and to improve user's immediacy by providing response data in a table form.

The embodiments of the present invention disclosed in the present specification and drawings are provided only to provide specific examples to easily describe the technical contents of the present invention and to aid understanding of the present invention, and are not intended to limit the scope of the present invention. It is obvious to those of ordinary skill in the art that other modifications based on the technical idea of the invention can be implemented in addition to the embodiments disclosed therein.

What is claimed is:

1. A computer-implemented method for generating and using a query vector to search information stored in one or more storage modules, which is performed by a server, the method comprising:
   a step A of storing, by the server, at least one table data in table form in a first data storage module of the one or more storage modules and storing, by the server, a table caption of the at least one table data in a second data storage module of the one or more storage modules, wherein the table caption is stored in the second data storage module in association with the at least one table data stored in the first data storage module;
   a step B of receiving, by the server, a user query from a user terminal;
   a step C of generating, by the server, a user query vector for the user query;
   a step D of extracting, by the server, candidate table data from the first data storage module by determining, by the server, a similarity between one or more table captions stored in the second data storage module and the user query vector and, based on a determination that the similarity between a first table caption of at least one first table data and the user query vector is greater than a threshold, extracting the at least one first table data stored in the first data storage module and associated with the first table caption as the candidate table data;
   a step E of searching, by the server, for a response corresponding to the user query vector in the candidate table data; and
   a step F of providing, by the server, the response to the user terminal by loading the response on the user terminal.

2. The method of claim 1, further comprising:
   receiving at least one document;
   extracting table data in table form in the document;
   generating first data by converting the table data into SQL table form;
   generating second data in a sentence form based on the first data; and
   storing the first data in the first data storage module and the second data in the second data storage module,
   wherein the first data stored in the first data storage module and the second data stored in the second data storage module are stored in association with each other.

3. The method of claim 2, wherein the first data and the second data are configured such that a query, a response to the query, and a query vector are associated with one another.

4. The method of claim 1, wherein the step C includes:
   analyzing the user query vector; and
   generating a schema of the first data storage module and an SQL query containing the user query vector based on the user query vector.

5. The method of claim 1, wherein the step E includes:
   extracting a candidate response by searching for the user query vector in the candidate table data;
   calculating a second similarity between the candidate response and the user query vector and setting the candidate response having a highest similarity as the response; and
   searching for first data corresponding to the response in the first data storage module.

6. The method of claim 1, wherein the step F includes:
   providing entire table data containing the response or a column containing the response of table data containing the response when providing the response to a user, and highlighting the column containing the response.

7. An in-document search device comprising:
   one or more processors configured to receive a user query, generate a user query vector for the user query, and analyze the user query vector; and
   the one or more processors further configured to store at least one table data in table form in a first data storage module of the one or more storage modules, store a table caption of the at least one table data in a second data storage module of the one or more storage modules, wherein the table caption is stored in the second data storage module in association with the at least one table data stored in the first data storage module, extract candidate table data from the first data storage module by determining a similarity between one or more table captions stored in the second data storage module and the user query vector and, based on a determination that the similarity between a first table caption of at least one first table data and the user query vector is greater than a threshold, extract the at least one first table data stored in the first data storage module and associated with the first table caption as the candidate table data, search for a response corresponding to the user query vector in the candidate table data, and provide the response to a user terminal by loading the response on the user terminal.

8. The in-document search device of claim 7, wherein the one or more processors are further configured to:
   receive at least one document;
   extract table data in a table form in the document; and
   generate first data by converting the table data into an SQL table form, generate second data in a sentence form based on the first data, and store the first data in the first data storage module and the second data in the second data storage module.

9. The in-document search device of claim 8,
   wherein the first data and the second data are configured such that a query, a response to the query, and a query vector are associated with one another, and wherein the first data stored in the first data storage module and the second data stored in the second data storage module are associated with each other.

10. The in-document search device of claim 7, wherein the one or more processors are further configured to extract a candidate response by searching for the user query vector in the candidate table data, set the candidate response having a highest similarity as the response by calculating a second similarity between the candidate response and the user query vector, and provide the response to the user terminal.

* * * * *